(12) United States Patent
Soeda et al.

(10) Patent No.: US 7,359,099 B2
(45) Date of Patent: Apr. 15, 2008

(54) IMAGE READING DEVICE AND IMAGE FORMING APPARATUS

(75) Inventors: Yoshihisa Soeda, Kanagawa (JP); Yoshikazu Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 908 days.

(21) Appl. No.: 09/859,501

(22) Filed: May 18, 2001

(65) Prior Publication Data
US 2002/0012127 A1 Jan. 31, 2002

(30) Foreign Application Priority Data
May 18, 2000 (JP) .............................. 2000-145878

(51) Int. Cl.
*H04N 1/46* (2006.01)
(52) U.S. Cl. ........................ 358/505; 358/521; 358/525
(58) Field of Classification Search ................. 358/1.9, 358/461, 504, 518, 523, 447, 483, 503, 1.13, 358/1.15, 453, 505, 511, 527, 538; 355/44, 355/59, 61
See application file for complete search history.

(56) References Cited

U.S. PATENT DOCUMENTS

| | | | |
|---|---|---|---|
| 4,841,376 A * | 6/1989 | Yamamoto et al. | 358/461 |
| 4,903,144 A | 2/1990 | Stefanik et al. | |
| 5,099,341 A * | 3/1992 | Nosaki et al. | 358/461 |
| 5,111,311 A * | 5/1992 | Yamamoto | 358/461 |
| 5,267,053 A * | 11/1993 | Potucek et al. | 358/446 |
| 5,371,613 A * | 12/1994 | Arimoto et al. | 358/461 |
| 5,442,464 A * | 8/1995 | Ito | 358/482 |
| 5,563,723 A * | 10/1996 | Beaulieu et al. | 358/461 |
| 5,644,409 A * | 7/1997 | Irie et al. | 358/461 |
| 5,659,355 A * | 8/1997 | Barron et al. | 348/245 |

(Continued)

FOREIGN PATENT DOCUMENTS

EP 0 632 644 1/1995

(Continued)

OTHER PUBLICATIONS

U.S. Appl. No. 09/859,501, filed May 18, 2001, Soeda et al.

(Continued)

*Primary Examiner*—David Moore
*Assistant Examiner*—James A. Thompson
(74) *Attorney, Agent, or Firm*—Oblon, Spivak, McClelland, Maier & Neustadt, P.C.

(57) ABSTRACT

An image reading device includes a photoelectric device provided with an empty transfer part. An A-D converter performing A-D conversion on an output signal for each pixel of the photoelectric device. A reference voltage varying part varies a reference voltage of the A-D converter. A detecting part detects a black correction reference data output from each pixel of the photoelectric device. A black shading correcting part subtracts the black correction reference data from digital image data obtained from the output signal for each pixel of the photoelectric device when an image is read by the A-D converter having the reference voltage set therein. And, a correcting part corrects the black correction reference data by a ratio of an output level of the empty transfer part obtained through the A-D converter when the black correction reference data is detected and an output level of the empty transfer part obtained through the A-D converter when the image is read.

20 Claims, 8 Drawing Sheets

U.S. PATENT DOCUMENTS

| | | | |
|---|---|---|---|
| 5,900,948 A * | 5/1999 | Shigeeda et al. | 358/448 |
| 5,943,141 A * | 8/1999 | Tamura | 358/461 |
| 6,028,958 A * | 2/2000 | Kanamori | 382/171 |
| 6,072,912 A * | 6/2000 | Orito | 358/461 |
| 6,198,845 B1 * | 3/2001 | Tse et al. | 382/169 |
| 6,665,096 B1 * | 12/2003 | Oh | 358/461 |
| 2002/0012127 A1 | 1/2002 | Soeda et al. | |

FOREIGN PATENT DOCUMENTS

| | | |
|---|---|---|
| JP | 57-148463 | 9/1982 |
| JP | 62-235871 | 10/1987 |
| JP | 63-18763 | 1/1988 |
| JP | 9-9056 | 1/1997 |
| JP | 9-224156 | 8/1997 |
| JP | 11-27522 | 1/1999 |

OTHER PUBLICATIONS

U.S. Appl. No. 10/612,933, filed Jul. 7, 2003, Ando et al.

U.S. Appl. No. 11/146,078, filed Jun. 7, 2005, Soeda.

* cited by examiner

IMAGE READING DEVICE AND IMAGE FORMING APPARATUS

BACKGROUND OF THE INVENTION

1. Field of the Invention

The present invention generally relates to an image reading device and an image forming apparatus in which a reference voltage used when A-D conversion is performed on an output of a photoelectric device is variable.

2. Description of the Related Art

In general, in an image reading device of a copier, a facsimile machine or the like, an original is exposed by a light source, a thus-obtained reflected light from the original is imaged onto a CCD image sensor. Thus, the image of the original is read, and, thus-obtained analog image data is A-D converted into digital data of 8 bits, for example.

In such a case, the CCD image sensor has a white shading function and a black shading function in general so that a dynamic range of an A-D converter can be used widely even if there occurs variation in sensitivity of the CCD image sensor, and variation in signal component due to dark current, for respective pixels. With regard to these functions, various methods have been proposed in Japanese Laid-Open Patent Applications Nos. 62-235871, 63-18763, 9-9056, 11-27522 and so forth, for example.

With regard to the black shading correction, in an image reading device in which an image of an original is formed on a CCD image sensor through a most general reduction (not unity magnification) optical system, when the CCD image sensor itself has always shaded black dummy pixels at a part thereof, black dummy output to be used for the black shading correction is always available, and, data (data for the black correction) of a reference black level for the black shading correction is always provided for each scan line. Therefore, even in such a case where the reference voltage of the A-D converter is variable, for example, a background removal function is provided such that the upper limit value of the reference voltage of the A-D converter which converts the read analog image data into digital data is made to follow the peak value of the read image data so that the tone of the background of a sheet of the original image may be cut off/removed from the image data, the data for the black correction (black correction data) used for the black shading correction can be made variable according to the variable reference voltage.

Thus, as a result of the black correction data being provided for each scan line, the black correction data can be made variable according to the reference voltage, even in such a case where the background removal function is provided in which the reference voltage of the A-D converter is variable.

However, in an image reading device employing a CCD image sensor not having such a measure as to provide the black correction data for each scan line or in a system which performs all pixel correction, it is necessary that the black correction data is generated for one scan line as a result of taking an image from the CCD image sensor with a fixed reference voltage applied to the A-D converter during an interval during which the light source is turned off before the original or a white reference plate is read, and then is stored in a memory. Therefore, in a case where the original is read with the variable reference voltage used by the A-D converter or the different reference voltages are used for reading of the white reference plate and the original, it is not possible to obtain the black correction data variable according to the reference voltage of the A-D converter, because the black correction data is maintained in the memory as mentioned above.

A digital black level value D0_b obtained when an analog black level value Vb is converted through an 8-bit A-D converter using the reference voltage Vref0 can be expressed by the following formula (1):

$$D0\_b = INT[Vb/Vref0 \times 255] \quad (1)$$

where INT[ ] means the value obtained from rounding off the value enclosed by [ ] to the decimal point, also hereinafter. Then, the data D0_b is stored and maintained in a predetermined memory to be used as the black correction data. As shown in the above formula (1), it can be seen that the black correction data D0_b depends on the reference voltage Vref0.

Image data Dshb obtained through the black shading correction from original image data D0_G is calculated by the following formula:

$$Dshb = D0\_G - D0\_b$$

However, in this case, $$Dshb = INT[Vw/Vref1 \times 255] - INT[Vb/Vref0 \times 255] \quad (2)$$

where Vw denotes a voltage of the analog image data obtained when the original is read, and Vref0 denotes the reference voltage of the A-D converter at this time. Thus, the reference voltage of the A-D converter is different between the case of detecting the reference black tone level and the case of reading the original, and, by using the digital image data obtained by using the different reference voltages of the A-D converter, the calculation of the black shading correction is performed. Thereby, precise calculation cannot be achieved.

SUMMARY OF THE INVENTION

An object of the present invention is to enable the black correction reference data according to the reference voltage to be obtained even when the reference voltage of the A-D converter varies, and thus, the black-level correction can be performed precisely.

Another object of the present invention is to enable such precise black level correction to be achieved even in a case where the photoelectric device is of a type of not having an empty transfer part.

Another object of the present invention is to enable the black level correction to be performed precisely even in a case where a unity magnification contact-type sensor not providing the black correction reference data for each scan line is used, and, also, the reference voltage of the A-D converter is different between a case of detecting the black correction reference data and a case of reading an original.

Another object of the present invention is to achieve the above-mentioned objects through a simple circuit configuration.

An image reading device according to the present invention comprises:

a photoelectric device provided with an empty transfer part;

an A-D converter performing A-D conversion on an output signal for each pixel of the photoelectric device;

a reference voltage varying part varying a reference voltage of the A-D converter;

a detecting part detecting a black correction reference data from output for each pixel of the photoelectric device;

a black shading correcting part subtracting the black correction reference data from digital image data obtained from the output signal for each pixel of the photoelectric device when an image is read by the A-D converter having the reference voltage set therein; and a correcting part correcting the black correction reference data by a ratio of an output level of the empty transfer part obtained through the A-D converter when the black correction reference data is detected and an output level of the empty transfer part obtained through the A-D converter when the image is read.

Thereby, even if the reference voltage of the A-D conversion is different between the detection of the black correction reference data and essential reading of the image, black level correction (or black shading correction) can be performed precisely.

An image reading device according to another aspect of the present invention comprises:

a photoelectric device;

a empty transfer part output generating part falsely generating an output of empty transfer part of the photoelectric device by outputting a predetermined voltage in predetermined timing;

an A-D converter performing A-D conversion on an output signal for each pixel of the photoelectric device;

a reference voltage varying part varying a reference voltage of the A-D converter;

a detecting part detecting a black correction reference data from output for each pixel of the photoelectric device;

a black shading correcting part subtracting the black correction reference data from digital image data obtained from the output signal for each pixel of the photoelectric device when an image is read by the A-D converter having the reference voltage set therein; and a correcting part correcting the black correction reference data by a ratio of an output level of the empty transfer part output generating part obtained through the A-D converter when the black correction reference data is detected and an output level of the empty transfer part output generating part obtained through the A-D converter when the image is read.

Thereby, even if the reference voltage of the A-D conversion is different between the detection of the black correction reference data and essential reading of the image, black shading correction can be performed precisely. Further, even when the photoelectric device does not have the empty transfer part, such a precise black level correction is enabled.

The photoelectric device may comprise a unity magnification contact-type sensor which receives reflected light from an original through a unity magnification optical system.

Thereby, even employing the unity magnification contact-type sensor which can provide no black correction reference data for each scan line, black shading correction can be performed precisely, even if the reference voltage of the A-D conversion is different between the detection of the black correction reference data and essential reading of the image.

The correcting part may comprise:

a first adding circuit calculating a sum of output levels of the empty transfer part for predetermined pixels obtained when the black correction reference data is detected;

a second adding circuit calculating a sum of output levels of the empty transfer part for predetermined pixels obtained when the image is read;

a multiplying circuit multiplying the sum output from the second adding circuit with the black correction reference data;

a dividing circuit dividing the result of multiplication output from the multiplying circuit by the sum output from the first adding circuit, and outputting the result of the division as the black correction reference data after the correction.

Thereby, it is possible to achieve the image reading device according to the present invention with a simple circuit configuration.

The correcting part may alternatively comprise:

a first adding circuit calculating a sum of falsely generated output levels of empty transfer part from the empty transfer part output generating part for predetermined pixels obtained when the black correction reference data is detected;

a second adding circuit calculating a sum of falsely generated output levels of empty transfer part from the empty transfer part output generating part for predetermined pixels obtained when the image is read;

a multiplying circuit multiplying the sum output from the second adding circuit with the black correction reference data;

a dividing circuit dividing the result of multiplication output from the multiplying circuit by the sum output from the first adding circuit, and outputting the result of the division as the black correction reference data after the correction.

Thereby, also by this configuration, it is possible to achieve the image reading device according to the present invention with a simple circuit configuration.

The correcting part may alternatively comprise:

a first adding circuit calculating a sum of output levels of the empty transfer part for predetermined pixels obtained when the black correction reference data is detected;

a second adding circuit calculating a sum of output levels of the empty transfer part for predetermined pixels obtained when the image is read;

a microcomputer multiplying the sum output from the second adding circuit with the black correction reference data; and dividing the result of the multiplication by the sum output from the first adding circuit, and outputting the result of the division as the black correction reference data after the correction.

Thereby, it is possible to achieve the image reading device according to the present invention with a simple circuit configuration.

The correcting part may alternatively comprise:

a first adding circuit calculating a sum of falsely generated output levels of empty transfer part from the empty transfer part output generating part for predetermined pixels obtained when the black correction reference data is detected;

a second adding circuit calculating a sum of falsely generated output levels of empty transfer part from the empty transfer part output generating part for predetermined pixels obtained when the image is read;

a microcomputer multiplying the sum output from the second adding circuit with the black correction reference data; and dividing the result of the multiplication by the sum output from the first adding circuit, and outputting the result of the division as the black correction reference data after the correction.

Thereby, it is possible to achieve the image reading device according to the present invention with a simple circuit configuration.

An image forming apparatus according to the present invention comprises:

the above-mentioned image reading device; and an image forming device forming an image on a sheet based on the image data read by the image reading device.

Other objects and further features of the present invention will become more apparent from the following detailed description when read in conjunction with the accompanying drawings.

DETAILED DESCRIPTION OF THE PREFERRED EMBODIMENTS

Figure 1:
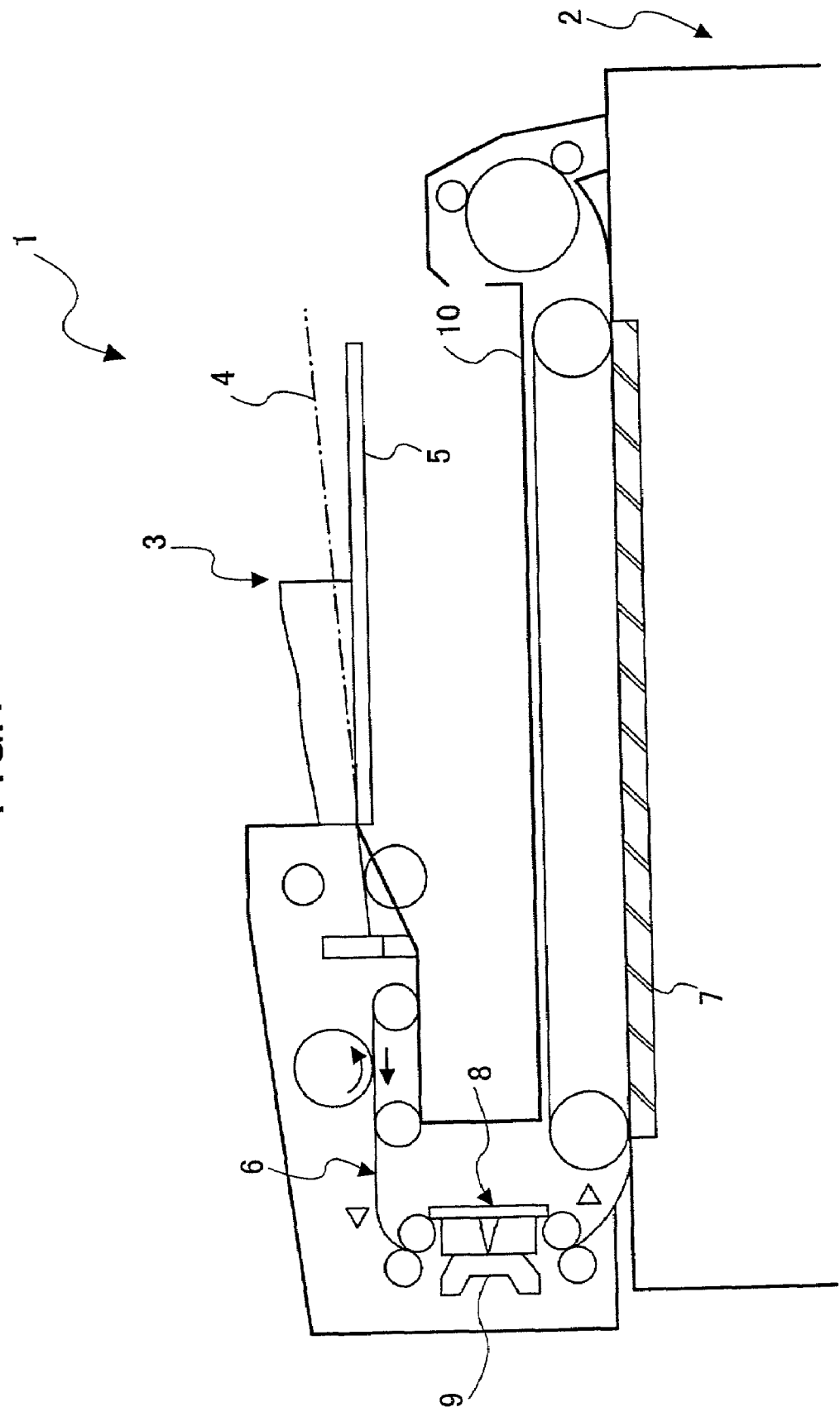
FIG. 1 generally shows a side elevational sectional view of an image reading device in a first embodiment of the present invention.

FIG. 1 shows a side elevational sectional view of an image scanner in a first embodiment of the present invention. The image scanner 1 includes a flat-bed scanner 2 well-known as a general image reading device, and an automatic document feeder (A-DF) 3 disposed above the flat-bed scanner 2.

The A-DF 3 includes a tray 5 on which original paper 4 is placed. The original paper 4 placed on the tray 5 is divided into individual pages thereof through a well-known mechanism, page by page, each page is conveyed through a conveying path 6, and, then, on a contact glass 7, an image thereof on the obverse side thereof is read by the flat-bed scanner 2. Then, this page of the original paper 4 is ejected to a paper ejecting tray 10.

Further, a contact-type image sensor 8 is disposed in the above-mentioned conveying path 6, scans the page of the original paper 4 conveyed through the conveying path 6 by exposure, and, thereby, reads an image of the reverse side of this page.

A white reference plate 9 is provided opposite to the contact-type image sensor 8 and is used as a white reference for correcting a variation for one scan line in a main scanning direction such as a variation in performances of a light source (LED array 11 shown in FIG. 2) itself for exposure and scanning built in the contact-type image sensor 8, a variation thereof due to temperature and/or aging thereof, and so forth, before the above-mentioned reading operation by the contact-type image sensor 8 is performed.

The contact-type image sensor 8 is a unity magnification contact-type sensor which receives reflected light from the page of the original paper 4 through a unity magnification optical system. When the above-mentioned white reference plate 9 is read by the contact-type image sensor 8, the gain of a variable gain amplifier included in the contact-type image sensor 8 is adjusted so that the peak value of the reading output from the contact-type image sensor 8 becomes a predetermined target value. After the contact-type image sensor 8 reads the white reference from the white reference plate 9, the page of the original paper 4 is conveyed there, and the image data thereof is read by the contact-type image sensor 8.

Figure 2:
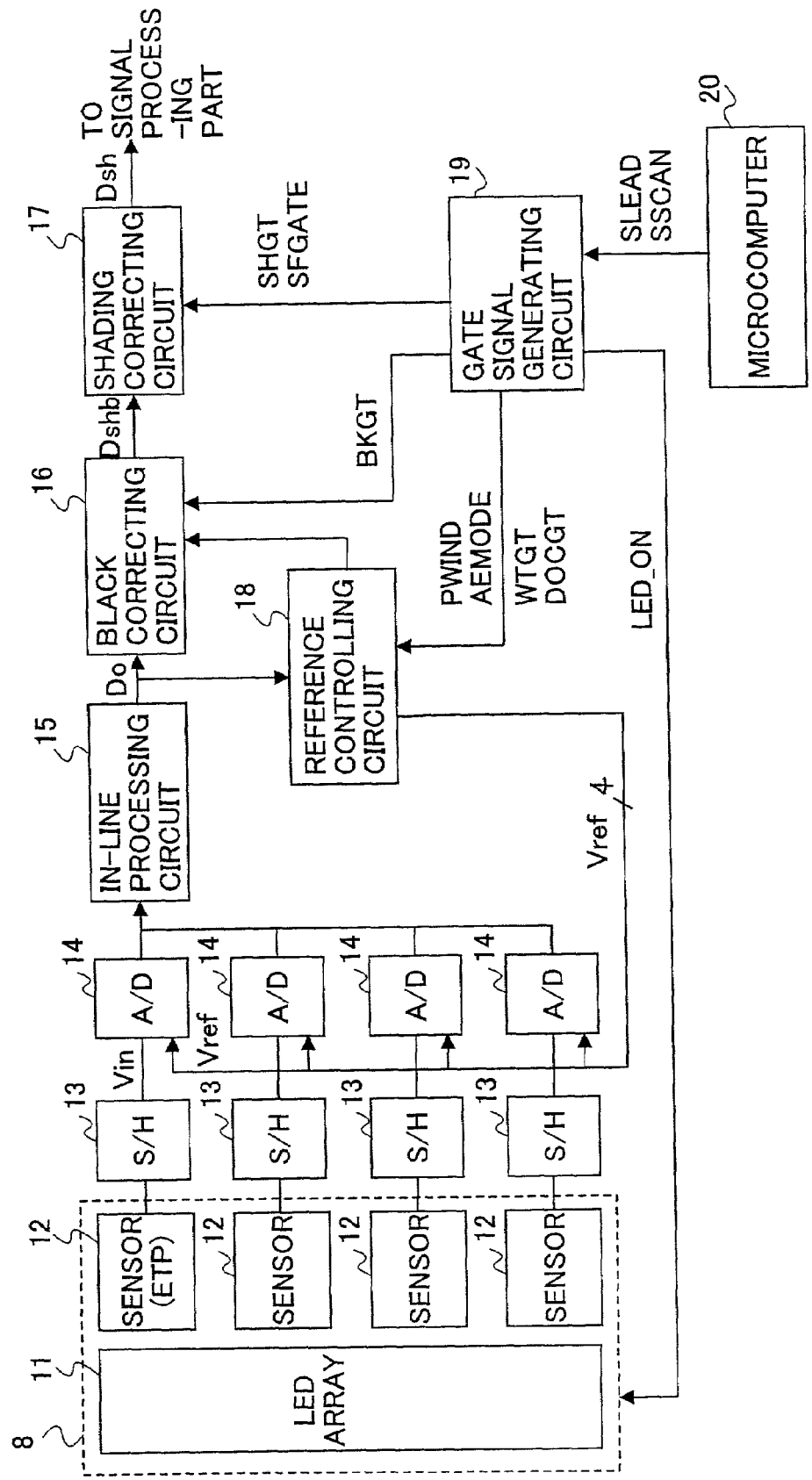
FIG. 2 shows a block diagram of an image reading unit of the image reading device shown in FIG. 1.

FIG. 2 shows a block diagram of an image reading unit including the above-mentioned contact-type image sensor 8 included in the image scanner 1 shown in FIG. 1.

In FIG. 2, when the white reference plate 9 or the page of the original paper 4 is irradiated by the LED array 11 of the contact-type image sensor 8, the reflected light therefrom is received by sensors 12 acting as photoelectric devices which thus read the image thereof. The image data output from each of the sensors 12 is sampled by a respective one of sample-hold (S/H) circuits 13, and, then, is held thereby until the subsequent sampling operation is performed.

The output of each of the S/H circuits 13 is input to an input terminal Vin of a respective one of A-D converters 14 A reference value is input to the other input terminal Vref of each of the A-D converters 14. Then, the A-D converter 14 determines a level of the input Vin with respect to the reference value Vref. Thus, the voltage input to the input terminal Vin is A-D converted by the A-D converter 14 so that corresponding digital image data is obtained thereby and output from the A-D converter 14.

The digital image data output from the respective A-D converters 14 undergoes in-line processing by an in-line processing circuit 15 such that the sequence of the digital image data is controlled so that the thus-obtained digital image data is such as that obtained from one-chip sensor.

Then, the thus-obtained digital image data undergoes black shading correction performed by a black correcting circuit 16 such that previously calculated black correction reference data is subtracted from the given digital image data. The image data having undergone the black shading correction then undergoes white shading correction performed by a shading correcting circuit 17 based on the shading data read from the above-mentioned white reference plate 9 as mentioned above. Then, the thus-obtained image data is output to a signal processing part, not shown in the figure, of the image scanner 1. Further, the image data output from the in-line processing circuit 15 is also input to a reference control circuit 18.

Figure 3:
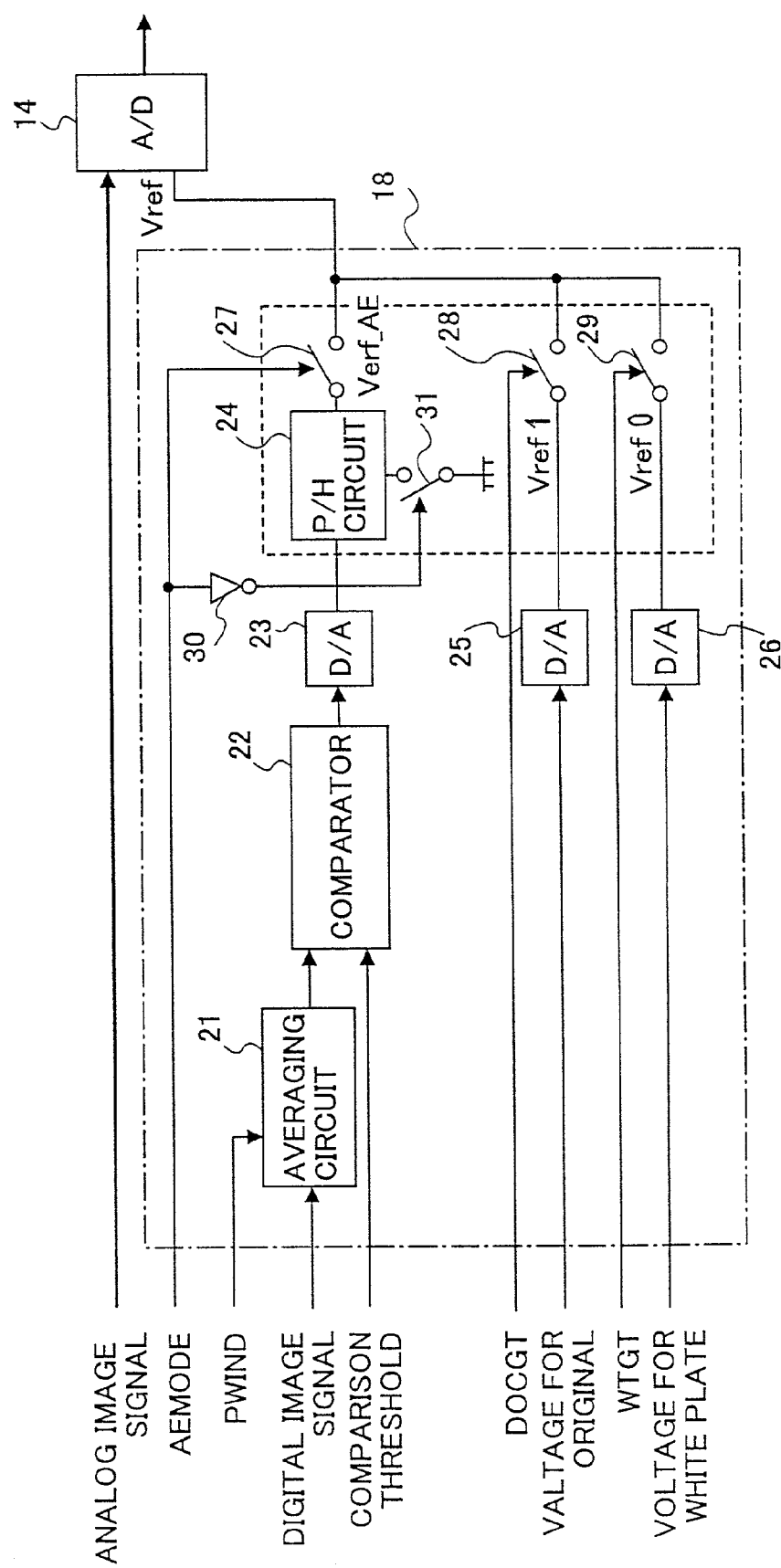
FIG. 3 shows a circuit diagram of a reference control circuit shown in FIG. 2.

FIG. 3 shows a block diagram of the reference control circuit 18 shown in FIG. 2.

As shown in FIG. 3, the digital image data having undergone the in-line processing so as to be combined together to become a scan line of image data by the in-line processing circuit 15 has noise thereof removed therefrom by an averaging circuit 21. The image data having had the noise removed by the averaging circuit 21 is compared with a predetermined threshold by a comparator 22. Then, when the image data is higher than the predetermined threshold, the comparator 22 outputs an H signal while the comparator 22 outputs an L signal when the image data is lower than the predetermined threshold.

The H/L signal thus output from the comparator 22 is converted into analog data by a D-A converter 23, and, the peak value of this analog data is detected by a peak hold (P/A) circuit 24 and is used as the reference voltage (Vref) for the A-D converters 14.

Three sorts of voltages are prepared to be used as the reference voltage (Vref) for the A-D converters 14, and, selection therefrom is made according to a current mode of the image scanner 1. In a mode in which a background removal function is used such that a tone of a background of a page sheet of the original paper 4 is removed, the output value (reference voltage Vref_AE) of the P/H circuit 24 is used as Vref for the A-D converters 14.

In a mode in which the above-mentioned background removal function is not used, a predetermined value for the white reference plate 9 and a predetermined value for the original paper 4 are D-A converted into reference voltages Vref0 and Vref1 by D-A converters 25 and 26, respectively, and appropriate one of them is used as the reference voltage Vref of the A-D converter 14. Selection from these three sorts of reference voltages Vref_AE, Vref1 and Vref0 is made as a result of switches 27, 28 or 29 being selectively closed by a gate signal WTGT, DOGGT, or AEMODE output from a gate signal generating circuit 19 (see FIG. 2).

A gate signal PWIND shown in FIGS. 2 and 3 is used for determining an interval for reading the background of the page sheet of the original paper 4 in the averaging circuit 21. Gate signals SHGT and SFGATE (see FIG. 5) are control signals for the white shading correction in the shading correcting circuit 17.

Further, an inverter 30 inverts the gate signal AEMODE, and the thus-obtained inverted signal is used for closing a switch 31, so as to connect the P/H circuit 24 to the ground and resets it. Furthermore, with regard to further details of the circuits shown in FIGS. 2 and 3, see Japanese Laid-Open Patent Application No. 9-224156.

The image data Dshb0 obtained after the above-mentioned black shading correction is performed by the black correcting circuit 16 is calculated by operation according to the following formula (3):

$$Dshb0 = D0\_G - D0b \times Vref0/Vref1 \qquad (3)$$

This formula (3) can be rewritten into the following formula (4):

$$Dshb0 = INT[Vw/Vref1 \times 255] - INT[Vb/Vref0 \times 255] \times Vref0/Vref1 = INT[Vw/Vref1 \times 255] - INT[Vb/Vref1 \times 255] = INT[(Vw - Vb)/Vref1 \times 255] \qquad (4)$$

where D0_G denotes the image data before the black shading correction is performed; Vw denotes the reading level voltage obtained from reading the page of the original paper 4; Vb denotes analog black level voltage which will be descried later; D0_b denotes the digital level value obtained from A-D converting the black level voltage Vb; and Vref0 and Vref1 denote the reference voltages for the 8-bit A-D converters 14 (Vref0 is used for the black level voltage Vb while Vref1 is used for the reading level voltage Vw of the original paper 4).

Thus, as can be seen therefrom, it is possible to obtain the digital image data having undergone the precise black shading correction by using black correction reference data (D0_b×Verf0/Verf1) according to the reference voltage Vref1 for the A-D converters 14, through the above-mentioned operation.

A digital black level value D0_t1 obtained from A-D converting an empty transfer level voltage Vt1 which is an analog output of an empty transfer part ETP (black dummy pixels always shaded and not used for reading an image, corresponding to, for example, the top sensor 12, shown in FIG. 2) of the sensors 12 while the reference voltage Vref for the 8-bit A-D converters 14 is Vref0, is expressed by the following formula (5):

$$D0\_t1 = INT[Vt1/Vref0 \times 255] \qquad (5)$$

On the other hand, a digital black level value D0_t2 obtained from A-D converting the same empty transfer level voltage Vt1 while the reference voltage Vref of the 8-bit A-D converters 14 is Vref1, is expressed by the following formula (6):

$$D0\_t2 = INT[Vt1/Vref1 \times 255] \qquad (6)$$

Then, $$Vref0/Vref1 = D0\_t2/D0\_t1 = \Sigma D0\_t2/\Sigma D0\_t1$$

Thus, the ratio of the reference voltages "Vref0/Vref1" can be obtained as the ratio of the reading data from the empty transfer part ETP of the sensors 12.

Accordingly, a digital black level value D0_bw which should be obtained from A-D converting the analog black level voltage Vb with the above-mentioned reference voltage Vref1, with respect to the above-mentioned digital black level value D0_b obtained from A-D converting the analog black level voltage Vb with the above-mentioned reference voltage Vref0, can be obtained from the following formula (7):

$$D0\_bw = D0\_b \times \Sigma D0\_t2/\Sigma D0\_t1 \qquad (7)$$

The reason why the ratio of the sums (Σ) for pixels of the above-mentioned empty transfer part ETP is used in the formula (7) is that error is to be reduced.

Thus, it is possible to obtain the black correction reference data D0_bw corrected according to the difference in reference voltage Vref of the A-D converters from the reading data from the empty transfer part ETP of the sensors 12. This can be easily achieved by detecting and calculating the ratio of the reference voltages as a digital amount as shown in the formula (7).

Figure 4:
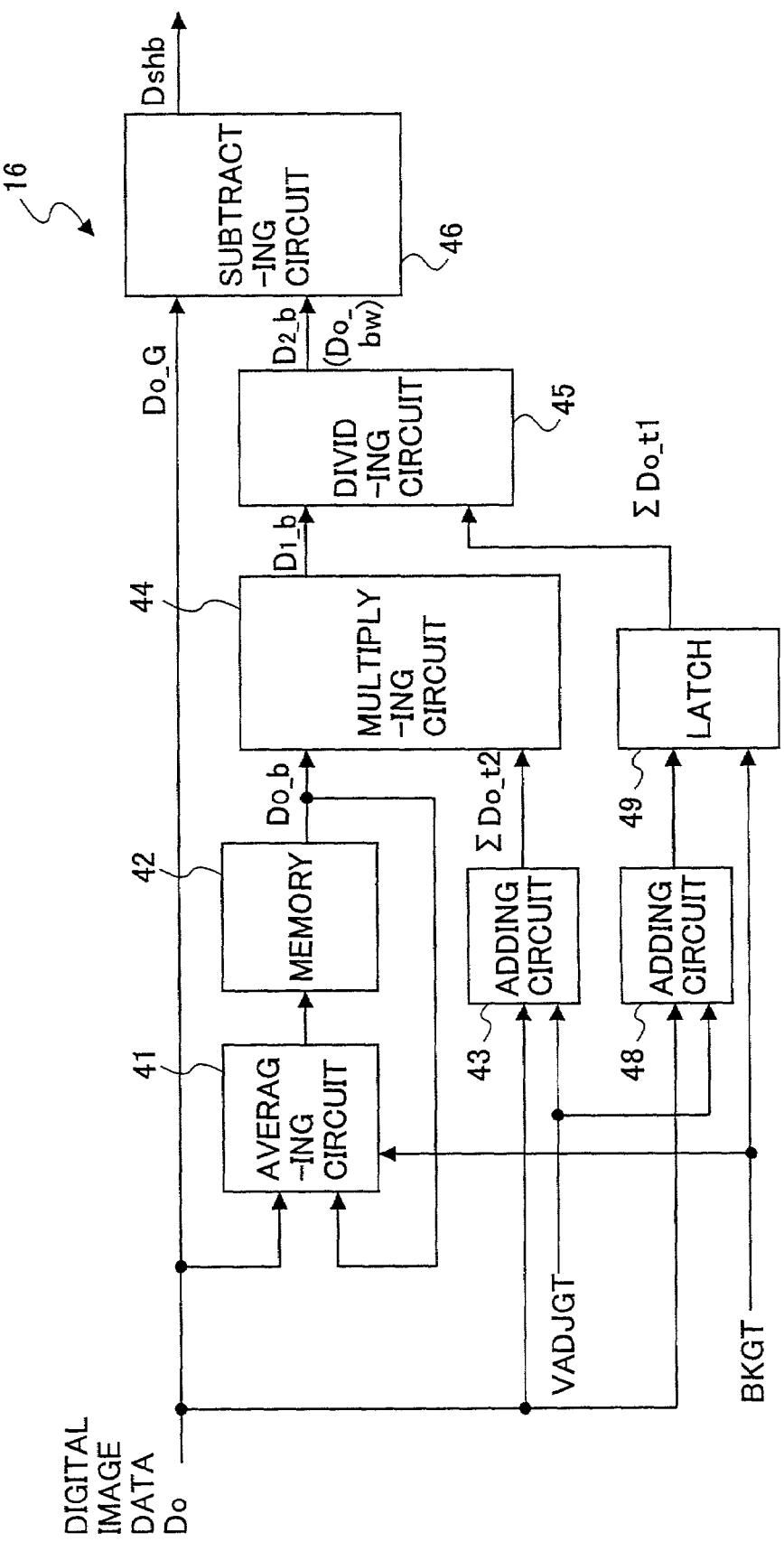
FIG. 4 shows a circuit diagram of a black correcting circuit shown in FIG. 2.

The above-mentioned black correcting circuit 16 has a configuration such as to enable the black shading correction according to this method to be executed. FIG. 4 shows a block diagram of the circuit configuration of the black correcting circuit 16, and FIG. 5 shows timing charts of respective signals thereof.

Figure 5:
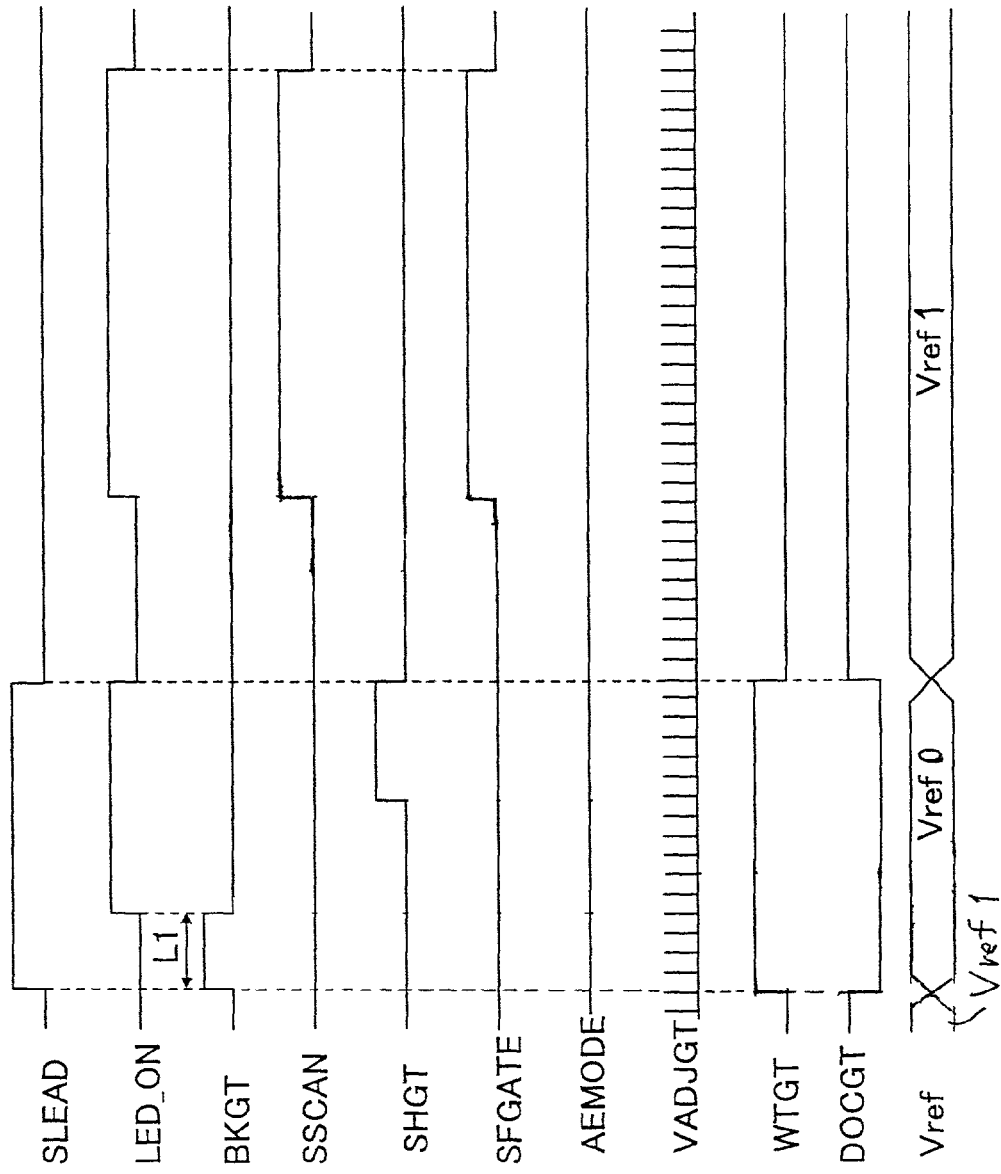
FIG. 5 shows timing charts of respective signals used in the configurations shown in FIGS. 2, 3 and 4.

First, when a page of the original paper 4 is fed by the ADF 3, as shown in FIG. 5, a gate signal SLEAD (signal indicating a reading range for the white reference plate 9) is output from a microcomputer 20, and, then, a light source turning on signal LED_ON for turning on the LED array 11 is made active. In this case, theme black correction reference data is obtained during an active interval of a gate signal BKGT for L1 scan lines (the interval of L1), from the time the gate signal SLEAD is made active until the time the light source turning on signal LED_ON is made active (so that the LED 11 is turned on).

During the L1 interval, the reference voltage Vref1 is selected (the gate signal DOCGT is asserted) by the reference control circuit 18, as the reference voltage Vref for the A-D converters 14.

The black correction reference data is obtained in the black correction circuit 16, and, during the interval during which the gate signal BKGT is asserted, as shown in FIG. 4, averaging is performed for each pixel by an averaging circuit 41 as follows:

$$D0\_b(n) = \Sigma D0(n)/L1$$

where:

D0_b(n) denotes the black correction reference data for n-th pixel;

D0(n) denotes the reading data from the sensor 12 for the n-th pixel; and

ΣD0(n) denotes the sum of D0(n) for the respective scan lines from 1 through L1.

Then, the thus-obtained black correction reference data is stored in a memory 42.

The output level of the above-mentioned empty transfer part ETP of the sensors 12 is taken by an adding circuit 48, the adding circuit 48 performs adding operation on the thus-taken data for the pixels of the empty transfer part ETP, and the adding result (ΣD0_t1) is output therefrom each time a predetermined clock signal VA-DJGT is asserted, which is then held by a latch circuit 49 at a negation edge of the signal BKGT. Accordingly, the latch 49 has the value obtained when the reference voltage for the A-D converters 14 is Vref0 held therein.

Further, the output level of the empty transfer part ETP of the sensors 12 is taken by an adding circuit 43, and the adding circuit 43 performs the adding operation on the thus-taken data for the pixels of the empty transfer part ETP, and outputs ΣD0_t2 each time of assertion of the signal VADJGT.

The above-mentioned signal VA-DJGT is asserted for each scan line, to the empty transfer part ETP (for example, on the order of 16 pixel clock periods).

At the beginning of an interval during which the signal SLEAD indicating a reading operation interval for reading the white reference plate 9 is asserted, the reference voltage Vref0 for the white reference plate 9 is selected as the reference voltage Vref of the A-D converters 14 (the gate signal WTGT is asserted). Then, Then, reading of the white reference plate 9 is started while the LED is turned off. During the interval L1, the black correction reference data is produced, as mentioned above. Then, after that, at a time the signal BKGT is negated after L1, production of the black correction reference data is finished, and the LED array 11 is turned on.

During the interval of assertion of WTGT included in the interval of assertion of SLEAD after negation of BKGT, white shading data is produced in the shading correcting circuit 17 from the thus-read data.

Thereby, all the data needed for the operation of the formula (7) is obtained.

First, a multiplying circuit 44 performs the following multiplication operation:

$$D1\_b = D0\_b \times \Sigma D0\_t2$$

where ΣD0_t2 is given by the adding circuit 43.

Then, a dividing circuit 45 performs the following division operation:

$$D2\_b = D1\_b / \Sigma D0\_t1$$

where ΣD0_t1 is given by the adding circuit 48, as mentioned above. Thus, the right side of the formula (7) is obtained (D2_b=D0_bw).

Thus, the black correction reference data D0_b is corrected by the ratio of the reading data from the empty transfer part ETP which corresponds to the ratio of the reference voltage Vref0 for the A-D converters 14 while the black correction reference data is obtained to also the reference voltage Vref0 for the A-D converters 14 when the white shading data is obtained, during the L1 interval. Accordingly, for reading the white reference plate 9, this ratio is 1, and, thus, no substantial correction is made. This is because, in this time, the reference voltage Vref when producing the black correction reference data is the same as that when producing the white shading data.

Then, in order to perform the essential black shading correction on the data read from the white reference plate 9 during the interval of assertion of WTGT, a subtracting circuit 46 performs the following subtraction operation:

$$Dshb = D0\_G - D2\_b$$

Thus, the operation of the formula (3) is completed so that the digital image data D0 undergoes the black shading correction so as to become the black corrected data Dshb to be output from the black correcting circuit 16.

Figure 6:
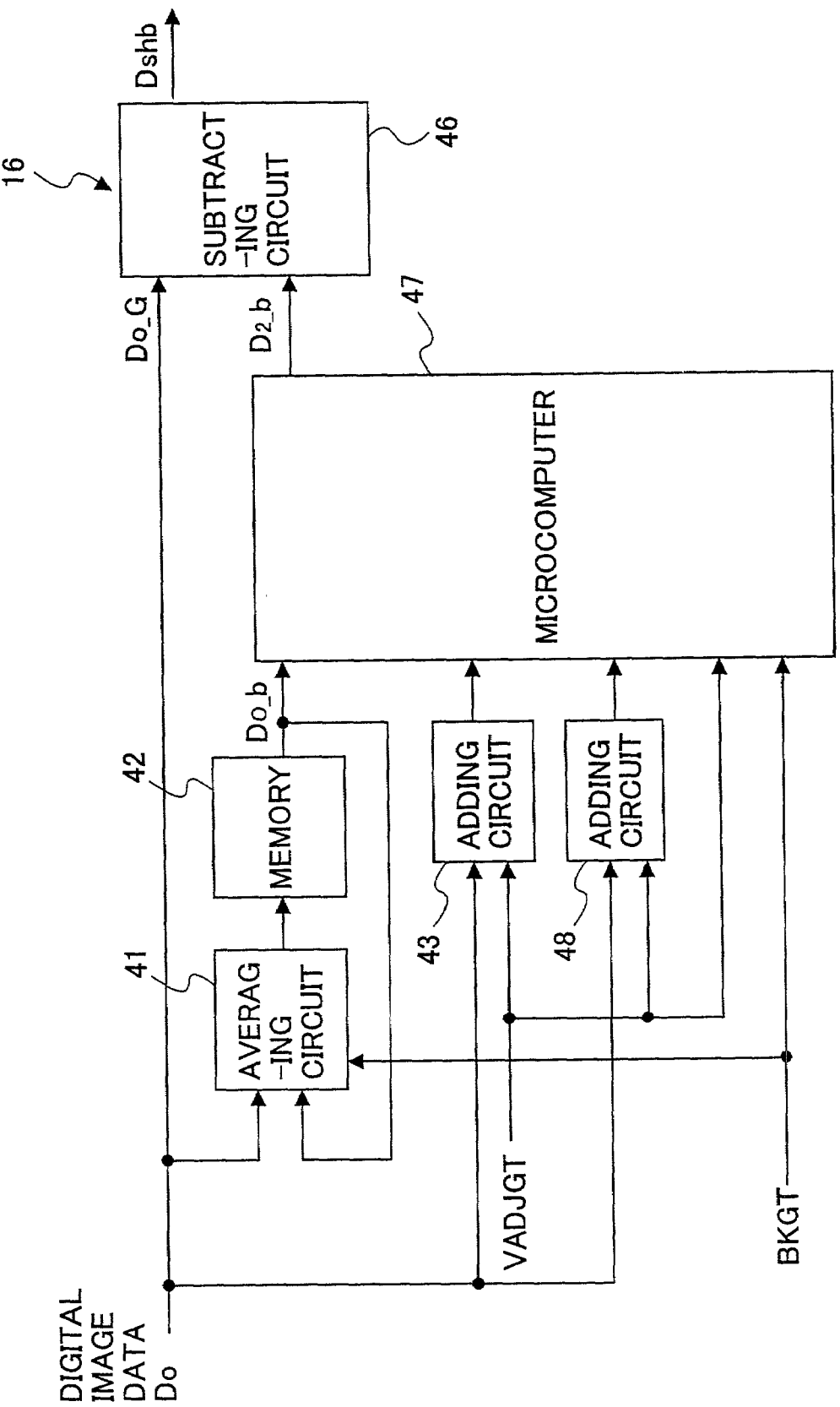
FIG. 6 shows another example of the circuit diagram of the black correcting circuit shown in FIG. 2.

In this case, it is also possible to substitute a microcomputer 47 for the multiplying circuit 44, dividing circuit 45 and latch 49, which microcomputer 47 outputs the black level value (corrected black correction reference data D2_b=D0_bw) to the subtracting circuit 46 (see FIG. 6).

Then, the signal SLEAD is negated, and reading of the white reference plate 9 and black correction of the thus-obtained image data is finished.

Then, Vref1 is selected as the reference voltage Vref for the A-D converters 14 (gate signal DOCGT is asserted). Then, when the page of the original paper 4 is conveyed to a reading position for the CCD image sensor 8, an SSCAN signal indicating an effective reading range for the conveyed page of the original paper 4 is asserted, the page of the original paper 4 is read, and the thus-read image data undergoes the black shading correction performed in the black correcting circuit 16 by using the black correction reference data corrected as mentioned above and the white shading correction performed in the white shading correcting circuit 17 by using the above-mentioned white shading data.

In this time, as mentioned above, the output from the empty transfer part ETP of the sensors 12 is obtained through the adding circuit 43 each time of assertion of VA-DJGT. Then, same as in the case for calculating the white shading data, the operation of correcting the black correction reference data D0_b output from the memory 42, and calculating the corrected black correction reference data (black level value) D2_b (=D0_bw) are performed each time the assertion of VA-DJGT through the circuits 44 and 45 while the data ΣD0_t1 corresponding to Vref0 obtained when the black correction reference data D0_b latched at the negation of L1 is provided from the latch 49.

Then, the thus-obtained corrected black correction reference data is used for the above-mentioned essential black shading correction performed by the subtracting circuit 46 on the image data read from the image of the page of the original paper 4. In this time, the ratio for correcting the black correction reference data D0_b is the ratio of the reading data from the empty transfer part ETP which corresponds to the ratio of the reference voltage Vref0 for the A-D converters 14 while the black correction reference data is obtained to the reference voltage Vref1 for the A-D converters 14 when the effective image data is read. Accordingly, the black correction reference data is corrected according to the currently reference voltage The thus-corrected image data is output to the signal processing part not shown in the figures.

By configuring as described above, it is possible to perform the black shading correction even when the original paper 4 is read by using the reference voltage Vref for the A-D converters different from that used when the black correction reference data is obtained. Thus, although the reference voltage Vref0 for the A-D converters used when the black correction reference data is obtained is different from the reference voltage Vref1 for the A-D converters used when the original paper 4 is read, or the reference voltage of the A-D converters varies while the original paper 4 is read, it is possible to perform the black shading correction at a high accuracy, because the black correction reference data is corrected by using the reference voltage Vref1 used when the original paper 4 (effective data) is read, as can be seen from the formula (3).

A second embodiment of the present invention will now be described with reference to FIG. 7.

Figure 7:
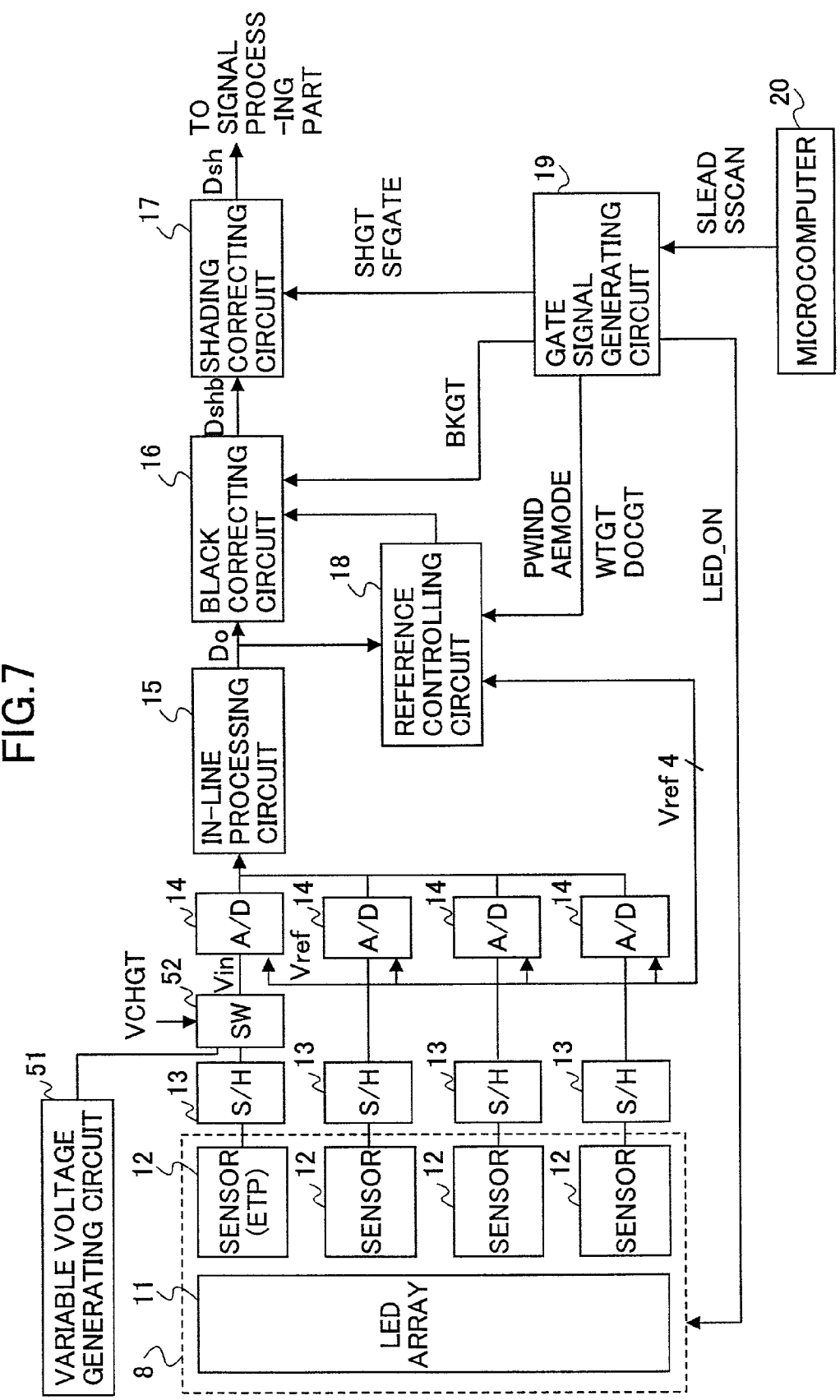
FIG. 7 shows a block diagram of an image reading unit of an image reading device in a second embodiment of the present invention.

Difference between the above-described first embodiment and the second embodiment is that, as shown in FIG. 7, the above-mentioned empty transfer part ETP is not provided in the sensors 12 in the second embodiment, and, a variable voltage generating circuit 51 and a switch 52 are provided, instead. The switch 52 is opened/closed by a signal VCHGT. The other configuration is the same as that of the first embodiment, and description of which is omitted with the same reference numerals given thereto.

In the second embodiment, by asserting the signal VCHGT, the switch 52 is closed so that a predetermined voltage is output to the A-D converter 14 of the plurality of A-D converters 14 from the variable voltage generating circuit 51 instead of the output of the corresponding sensor 12 (ETP, in FIG. 2) and S/H circuit 13. Thereby, it is possible that the effect same as that obtained when the empty transfer part (ETP) were provided in the sensors 12 is obtained as a result of the variable voltage generating circuit 51 providing a false output of the output of the empty transfer part (ETP).

Accordingly, even when the sensors 12 have no empty transfer part (ETP), it is possible to perform the precise black shading correction same as in the above-described first embodiment.

A third embodiment of the present invention will now be described with reference to FIG. 8.

Figure 8:
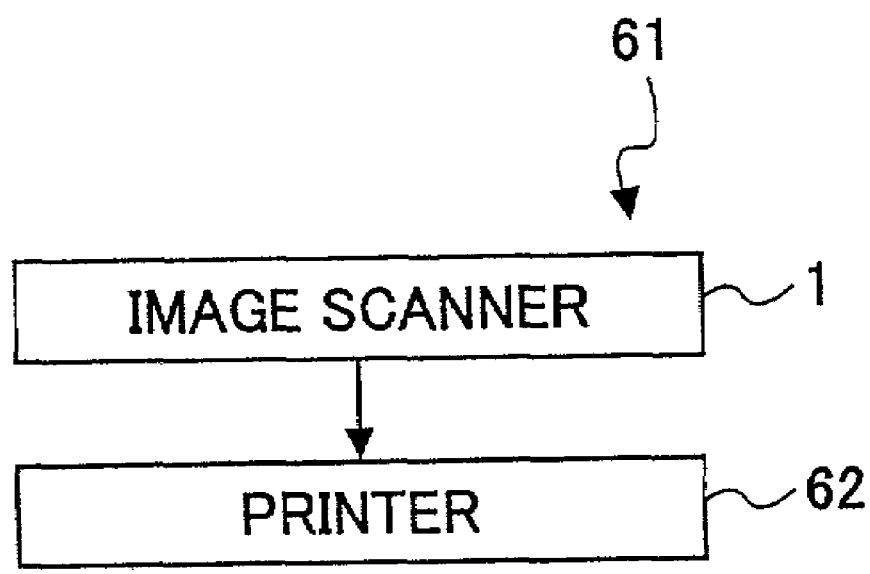
FIG. 8 generally shows a block diagram of a copier in a third embodiment of the present invention.

The third embodiment of the present invention is a copier 61 shown in FIG. 8 as an image forming apparatus. The copier 61 includes the image scanner 1 in any of the above-described first and second embodiments of the present invention, and a printer 62 which forms an image on a paper sheet based on the image data of the page of the original paper 4 read through the image scanner 1. This printer 62 may be of any of various types such as an electrostatic photographic type, an ink-jet type, a sublimation-type thermal transfer type, a silver-bromide photographic type, a direct heat sensitive recording type, a melting-type thermal transfer type and so forth.

The present invention is not limited to the above-described embodiments, and variations and modifications may be made without departing from the scope of the present invention.

The present application is based on Japanese priority application No. 2000-145878, filed on May 18, 2000, the entire contents of which are hereby incorporated by reference.

What is claimed is:

1. An image reading device comprising:
   a photoelectric device including a plurality of pixels and provided with an empty transfer part, the empty transfer part outputting an empty transfer level corresponding to black dummy pixels which are always shaded and are not used for reading an image;
   an A-D converter performing A-D conversion on an output signal for each pixel of said photoelectric device;
   a reference voltage varying part varying a reference voltage of said A-D converter to vary between first, second, and third reference voltages based on a current mode of an image scanner, the first reference voltage selected for a background removal function, and one of the second and third reference voltages being selected when the background removal function is not used;
   a detecting part detecting a black correction reference data from an output signal for each pixel of said photoelectric device;
   a black shading correcting part subtracting the black correction reference data from digital image data obtained from the output signal for each pixel of said photoelectric device when an image is read, through said A-D converter having the reference voltage set therein; and
   a correcting part correcting the black correction reference data by a ratio between a first digital black level value obtained from an output voltage level of said empty transfer part obtained through said A-D converter when the black correction reference data is detected and a second digital black level value obtained from an output voltage level of said empty transfer part obtained through said A-D converter when the image is read.

2. The image reading device as claimed in claim 1, wherein said photoelectric device comprises a unity magnification contact-type sensor which receives reflected light from an original through a unity magnification optical system.

3. The image reading device as claimed in claim 1, wherein said correcting part comprises:
   a first adding circuit calculating a sum of output levels of said empty transfer part for predetermined pixels obtained when the black correction reference data is detected;
   a second adding circuit calculating a sum of output levels of said empty transfer part for the predetermined pixels obtained when the image is read;
   a multiplying circuit multiplying the sum output from said second adding circuit with the black correction reference data;
   a dividing circuit dividing the result of multiplication output from said multiplying circuit by the sum output from said first adding circuit, and outputting the result of the division as the black correction reference data after the correction.

4. The image reading device as claimed in claim 1, wherein said correcting part comprises:
   a first adding circuit calculating a sum of output levels of said empty transfer part for predetermined pixels obtained when the black correction reference data is detected;
   a second adding circuit calculating a sum of output levels of said empty transfer part for the predetermined pixels obtained when the image is read;
   a microcomputer multiplying the sum output from said second adding circuit with the black correction reference data and dividing the result of the multiplication by the sum output from said first adding circuit, and outputting the result of the division as the black correction reference data after the correction.

5. An image forming apparatus comprising: the image reading device claimed in claim 1; and
   an image forming device forming an image on a sheet based on the image data read by said image reading device.

6. An image reading device comprising:
a photoelectric device including a plurality of pixels and an empty transfer part, the empty transfer part outputting an empty transfer level corresponding to black dummy pixels which are always shaded and are not used for reading an image;
an empty transfer part output generating part falsely generating an output of the empty transfer part of said photoelectric device by outputting a predetermined voltage at a predetermined timing;
an A-D converter performing A-D conversion on an output signal for each pixel of said photoelectric device;
a reference voltage varying part varying a reference voltage of said A-D converter to vary between first, second, and third reference voltages based on a current mode of an image scanner, the first reference voltage selected for a background removal function, and one of the second and third reference voltages being selected when the background removal function is not used;
a detecting part detecting a black correction reference data from an output signal for each pixel of said photoelectric device;
a black shading correcting part subtracting the black correction reference data from digital image data obtained from the output signal for each pixel of said photoelectric device when an image is read, through said A-D converter having the reference voltage set therein; and
a correcting part correcting the black correction reference data by a ratio of a first digital black level value obtained from an output voltage level of said empty transfer part output generating part obtained through said A-D converter when the black correction reference data is detected and a second digital black level value obtained from an output voltage level of said empty transfer part output generating part obtained through said A-D converter when the image is read.

7. The image reading device as claimed in claim 6, wherein said photoelectric device comprises a unity magnification contact-type sensor which receives reflected light from an original through a unity magnification optical system.

8. The image reading device as claimed in claim 6, wherein said correcting part comprises:
a first adding circuit calculating a sum of false output levels of said empty transfer part from said empty transfer part output generating part for predetermined pixels obtained when the black correction reference data is detected;
a second adding circuit calculating a sum of false output levels of said empty transfer part from said empty transfer part output generating part for the predetermined pixels obtained when the image is read;
a multiplying circuit multiplying the sum output from said second adding circuit with the black correction reference data;
a dividing circuit dividing the result of multiplication output from said multiplying circuit by the sum output from said first adding circuit, and outputting the result of the division as the black correction reference data after the correction.

9. The image reading device as claimed in claim 6, wherein said correcting part comprises:
a first adding circuit calculating a sum of false output levels of said empty transfer part from said empty transfer part output generating part for predetermined pixels obtained when the black correction reference data is detected;
a second adding circuit calculating a sum of false output levels of said empty transfer part from said empty transfer part output generating part for the predetermined pixels obtained when the image is read;
a microcomputer multiplying the sum output from said second adding circuit with the black correction reference data and dividing the result of the multiplication by the sum output from said first adding circuit, and outputting the result of the division as the black correction reference data after the correction.

10. An image forming apparatus comprising: the image reading device claimed in claim 6; and
an image forming device forming an image on a sheet based on the image data read by said image reading device.

11. An image reading device comprising:
photoelectric means including a plurality of pixels and provided with an empty transfer part, the empty transfer part outputting an empty transfer level corresponding to black dummy pixels which are always shaded and are not used for reading an image;
A-D converting means for performing A-D conversion on an output signal for each pixel of said photoelectric means;
reference voltage varying means for varying a reference voltage of said A-D converting means to vary between first, second, and third reference voltages based on a current mode of an image scanner, the first reference voltage selected for a background removal function, and one of the second and third reference voltages being selected when the background removal function is not used;
detecting means for detecting a black correction reference data from an output signal for each pixel of said photoelectric means;
black shading correcting means for subtracting the black correction reference data from digital image data obtained from the output signal for each pixel of said photoelectric means when an image is read, through said A-D converting means having the reference voltage set therein; and
correcting means for correcting the black correction reference data by a ratio a first digital black level value obtained from of an output voltage level of said empty transfer part obtained through said A-D converting means when the black correction reference data is detected and a second digital black level value obtained from an output voltage level of said empty transfer part obtained through said A-D converting means when the image is read.

12. The image reading device as claimed in claim 11, wherein said photoelectric means comprises a unity magnification contact-type sensor which receives reflected light from an original through a unity magnification optical system.

13. The image reading device as claimed in claim 11, wherein said correcting means comprises:
first adding means for calculating a sum of output levels of said empty transfer part for predetermined pixels obtained when the black correction reference data is detected;
second adding means for calculating a sum of output levels of said empty transfer part for the predetermined pixels obtained when the image is read;

multiplying means for multiplying the sum output from said second adding means with the black correction reference data;

dividing means for dividing the result of multiplication output from said multiplying means by the sum output from said first adding means, and outputting the result of the division as the black correction reference data after the correction.

14. The image reading device as claimed in claim 11, wherein said correcting means comprises:

first adding means for calculating a sum of output levels of said empty transfer part for predetermined pixels obtained when the black correction reference data is detected;

second adding means for calculating a sum of output levels of said empty transfer part for the predetermined pixels obtained when the image is read;

a microcomputer multiplying the sum output from said second adding means with the black correction reference data and dividing the result of the multiplication by the sum output from said first adding means, and outputting the result of the division as the black correction reference data after the correction.

15. An image forming apparatus comprising: the image reading device claimed in claim 11; and image forming means for forming an image on a sheet based on the image data read by said image reading device.

16. An image reading device comprising:

photoelectric means including a plurality of pixels and an empty transfer part, the empty transfer part outputting an empty transfer level corresponding to black dummy pixels which are always shaded and are not used for reading an image;

empty transfer part output generating means for falsely generating an output of the empty transfer part of said photoelectric means by outputting a predetermined voltage in predetermined timing;

A-D converting means for performing A-D conversion on an output signal for each pixel of said photoelectric means;

reference voltage varying means for varying a reference voltage of said A-D converting means to vary between first, second, and third reference voltages based on a current mode of an image scanner, the first reference voltage selected for a background removal function, and one of the second and third reference voltages being selected when the background removal function is not used;

detecting means for detecting a black correction reference data from an output signal for each pixel of said photoelectric means;

black shading correcting means for subtracting the black correction reference data from digital image data obtained from the output signal for each pixel of said photoelectric means when an image is read, through said A-D converting means having the reference voltage set therein; and correcting means correcting the black correction reference data by a ratio of a first digital black level value obtained from an output voltage level of said empty transfer part output generating means obtained through said A-D converting means when the black correction reference data is detected and a second digital black level value obtained from an output voltage level of said empty transfer part output generating means obtained through said A-D converting means when the image is read.

17. The image reading device as claimed in claim 16, wherein said photoelectric means comprises a unity magnification contact-type sensor which receives reflected light from an original through a unity magnification optical system.

18. The image reading device as claimed in claim 16, wherein said correcting means comprises:

first adding means for calculating a sum of false output levels of said empty transfer part from said empty transfer part output generating means for predetermined pixels obtained when the black correction reference data is detected;

second adding means for calculating a sum of false output levels of said empty transfer part from said empty transfer part output generating means for the predetermined pixels obtained when the image is read;

multiplying means for multiplying the sum output from said second adding means with the black correction reference data;

dividing means for dividing the result of multiplication output from said multiplying means by the sum output from said first adding means, and outputting the result of the division as the black correction reference data after the correction.

19. The image reading device as claimed in claim 16, wherein said correcting means comprises:

first adding means for calculating a sum of false output levels of said empty transfer part from said empty transfer part output generating means for predetermined pixels obtained when the black correction reference data is detected;

second adding means for calculating a sum of false output levels of said empty transfer part from said empty transfer part output generating means for the predetermined pixels obtained when the image is read;

a microcomputer multiplying the sum output from said second adding means with the black correction reference data and dividing the result of the multiplication by the sum output from said first adding means, and outputting the result of the division as the black correction reference data after the correction.

20. An image forming apparatus comprising: the image reading device claimed in claim 16; and image forming means for forming an image on a sheet based on the image data read by said image reading device.

* * * * *